US012659254B2

(12) United States Patent
Kang et al.

(10) Patent No.: US 12,659,254 B2
(45) Date of Patent: Jun. 16, 2026

(54) ON-DEVICE-BASED DATA ANALYSIS SYSTEM AND METHOD

(71) Applicant: KOREA ELECTRONICS TECHNOLOGY INSTITUTE, Seongnam-si (KR)

(72) Inventors: Jeong Hoon Kang, Seoul (KR); Hyo Sub Choi, Yongin-si (KR); Changwoo Kim, Siheung-si (KR); Chulseoung Chae, Gunsan-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/257,121

(22) PCT Filed: Dec. 18, 2020

(86) PCT No.: PCT/KR2020/018631
§ 371 (c)(1),
(2) Date: Jun. 13, 2023

(87) PCT Pub. No.: WO2022/131404
PCT Pub. Date: Jun. 23, 2022

(65) Prior Publication Data
US 2024/0106728 A1      Mar. 28, 2024

(30) Foreign Application Priority Data
Dec. 14, 2020      (KR) ........................ 10-2020-0174840

(51) Int. Cl.
*H04L 43/0876* (2022.01)
*H04L 41/16* (2022.01)

(52) U.S. Cl.
CPC .......... *H04L 43/0876* (2013.01); *H04L 41/16* (2013.01)

(58) Field of Classification Search
CPC ........................... H04L 43/0876; H04L 41/16
See application file for complete search history.

(56) References Cited

U.S. PATENT DOCUMENTS 12,218,856 B1 *    2/2025    Suit ..................... G06F 9/45558
2015/0195416 A1    7/2015    Lingafelt et al.
(Continued)

FOREIGN PATENT DOCUMENTS

KR      10-2016-0084215 A      7/2016
KR      10-2018-0051242 A      5/2018
(Continued)

*Primary Examiner* — Apu M Mofiz
*Assistant Examiner* — Husam Turki Samara
(74) *Attorney, Agent, or Firm* — You & IP, LLC

(57) ABSTRACT

An on-device based data analysis system and a method are proposed. According to specific examples of the system and method, when a size of measurement data collected from sensors, processes, or various equipment according to a user request is greater than or equal to an upper limit of a predetermined range of an on-device resource usage rate, the collected measurement data is transmitted to a cloud server to perform noise removal, pre-processing, and analysis on the measurement data on a cloud-basis, and when the size of the measurement data is within the predetermined range of the on-device resource usage rate or is less than a lower limit, the noise removal, pre-processing, and analysis is performed on the measurement data on an on-device basis, so that distributed processing between the on-device processing device and the cloud server is performable, whereby loads on the cloud server may be reduced.

7 Claims, 3 Drawing Sheets

(56)     References Cited

U.S. PATENT DOCUMENTS

2015/0220438 A1     8/2015   Chakalian et al.
2018/0129726 A1     5/2018   Park et al.
2021/0346916 A1*   11/2021   Kumar ..................... B07C 5/34

FOREIGN PATENT DOCUMENTS

KR     10-2018-0096310  A     8/2018
KR          10-2182606  B1    11/2020

* cited by examiner

ON-DEVICE-BASED DATA ANALYSIS SYSTEM AND METHOD

TECHNICAL FIELD

The present disclosure relates to an on-device based data analysis system and a method and, more particularly, to a technology for enabling loads of a cloud server to be reduced as collected measurement data is transmitted to the cloud server in a case where a size of the measurement data collected based on a user request exceeds an on-device resource usage rate.

BACKGROUND ART

Cloud computing refers to a computing model capable of reducing costs by efficiently utilizing relatively large computing resources that are collected in one place. A Cloud Service Provider (CSP) provides the computing resources according to demands of cloud users, thereby efficiently using computing resources thereof.

Through the cloud computing, the cloud users may use the computing resources as much as they desire without having to build their own computing environments, and service charges depending on the usage may be paid to the cloud service provider.

The cloud computing is the highly promising computing model, and in this regard, a global cloud market size reached about 80 billion dollars in 2009 and was predicted to grow to 109.5 billion dollars in 2010, and accordingly, most computing models are expected to change to cloud computing models.

However, pre-processing and analysis in the cloud computing method are processed by a cloud server, so storage spaces for storing data are required to be increased in order to process ever-increasing data, and also analysis performance should become higher to process the increasing data. Accordingly, a limit has been reached where hardware construction costs increase as the amount of data increases.

Therefore, the present applicant intends to propose a plan for enabling loads of a cloud server to be reduced as collected measurement data is transmitted to the cloud server in a case where a size of the measurement data collected from sensors, processes, or various equipment according to a user request exceeds an on-device resource usage rate.

DOCUMENTS OF RELATED ART

[Patent Document] Korea Patent No. 10-2182606 (SMART REPLIES USING ON-DEVICE MODEL)

DISCLOSURE

Technical Problem

An objective of the present disclosure is to provide an on-device based data analysis system and a method for enabling loads of a cloud server to be reduced as collected measurement data is transmitted to the cloud server in a case where a size of the measurement data collected from sensors, processes, or various equipment according to a user request exceeds an on-device resource usage rate.

Accordingly, another objective of the present disclosure is to provide an on-device based data analysis system and a method capable of checking an analysis result in real time as the analysis result is provided in real time on the basis of distributed processing by a cloud server and an on-device processing device.

The objectives of the present disclosure is not limited to the above-mentioned objectives, and other objectives and strong points of the present disclosure not mentioned above can be understood by the following description, and can be more clearly understood by exemplary embodiments of the present disclosure. Further, it will be readily apparent that the objectives and strong points of the present disclosure may be realized by the means and combinations thereof indicated in the appended claims.

Technical Solution

According to an exemplary embodiment of the present disclosure, there is provided an on-device based data analysis system, the system including:

an on-device processing device configured to collect a plurality of pieces of measurement data provided from an outside, perform pre-processing and analysis on the collected measurement data, and transmit an analysis result to a visualization dashboard.

In the on-device processing device, the device is provided to transmit the collected measurement data exceeding an on-device resource usage rate to a cloud server on the basis of a comparison result of a size of the collected measurement data and the on-device resource usage rate.

Preferably, the on-device processing device may include:

a measurement data collection unit for collecting the plurality of pieces of the measurement data provided from the outside;

a first comparison unit for comparing whether the size of the collected measurement data is within a predetermined range of the on-device resource usage rate; and a first processing unit for dividing the measurement data per unit size per unit time in a case where the size of the measurement data is within the predetermined range of the on-device resource usage rate as a result of the comparison, and then performing the pre-processing and the analysis on the divided measurement data.

Preferably, the on-device processing device may further include:

a second comparison unit for comparing the size of the measurement data with a lower limit of the predetermined range of the on-device resource usage rate in a case where the size of the measurement data is not within the predetermined range of the on-device resource usage rate; and a second processing unit for performing noise removal and the pre-processing of the collected measurement data in a case where the size of the measurement data is less than the lower limit of the predetermined range of the on-device resource usage rate.

Preferably, the on-device processing device may further include:

a first determination unit for determining whether the noise removal and the pre-processing of the second processing unit is normally performed or not; and a third processing unit for performing the noise removal and the pre-processing on the divided measurement data by learning based on a previously created artificial intelligence model in a case where the noise removal and the pre-processing are abnormally performed as a result of the first determination unit.

Preferably, the on-device processing device may further include:

a second determination unit for determining whether the learning based on the artificial intelligence model is normally performed or not; and a communication unit for transmitting the collected measurement data to the cloud server in a case where the artificial intelligence-based learning is abnormal as a result of the determination of the second determination unit or in a case where the size of the measurement data is greater than or equal to an upper limit of the predetermined range of the on-device resource usage rate.

According to another exemplary embodiment of the present disclosure, there is provided an on-device based data analysis method, the method including:

a measurement data collection step of collecting a plurality of pieces of measurement data provided from an outside;

a first comparison step of comparing a size of the collected measurement data with a predetermined on-device resource usage rate and determining whether the size of the collected measurement data is within a predetermined range of the on-device resource usage rate on the basis of a comparison result; and a first processing step of performing pre-processing and analysis on the collected measurement data in a case where the size of the collected measurement data is within the predetermined range of the on-device resource usage rate.

Preferably, the first comparison step may further include:

a second comparison step of comparing the size of the collected measurement data with a lower limit of the predetermined range of the on-device resource usage rate in a case where the size of the collected measurement data is not within the predetermined range of the on-device resource usage rate; and a second processing step of performing noise removal and the pre-processing of the collected measurement data in a case where the size of the measurement data is less than the lower limit of the predetermined range of the on-device resource usage rate.

Preferably, the second processing step may further include:

a first determination step of determining whether the noise removal and the pre-processing of the measurement data is normal or not; and a third processing step of performing the noise removal and the pre-processing of the measurement data by performing artificial intelligence model-based learning on the measurement data in a case where the noise removal and the pre-processing of the measurement data is abnormal.

Preferably, the first determination step may further include:

a second determination step of determining whether the artificial intelligence model learning for the collected measurement data is normally performed or not; and a communication step of transmitting the collected measurement data to a cloud server in a case where the artificial intelligence model learning for the collected measurement data is abnormally performed.

Advantageous Effects

According to these features, in a case where a size of measurement data collected from sensors, processes, or various equipment according to a user request is greater than or equal to an upper limit of a predetermined range of an on-device resource usage rate, the collected measurement data is transmitted to a cloud server to perform noise removal, pre-processing, and analysis on the measurement data on a cloud-basis, and in a case where a size of measurement data is within the predetermined range of the on-device resource usage rate or is less than a lower limit, the noise removal, pre-processing, and analysis is performed on the measurement data on an on-device basis, so that distributed processing between the on-device processing device and the cloud server is performable, whereby loads on the cloud server may be reduced.

In addition, according to the exemplary embodiment, there is an effect that an analysis result may be confirmed in real time through a visualization dashboard.

DESCRIPTION OF DRAWINGS

The following drawings attached to the present specification illustrate a preferred exemplary embodiment of the present disclosure, and serve to further understand the technical spirit of the present disclosure together with the detailed description of the present disclosure to be described below, so the present disclosure should not be construed as being limited only to the matters described in the drawings.

BEST MODE

Figure 1:
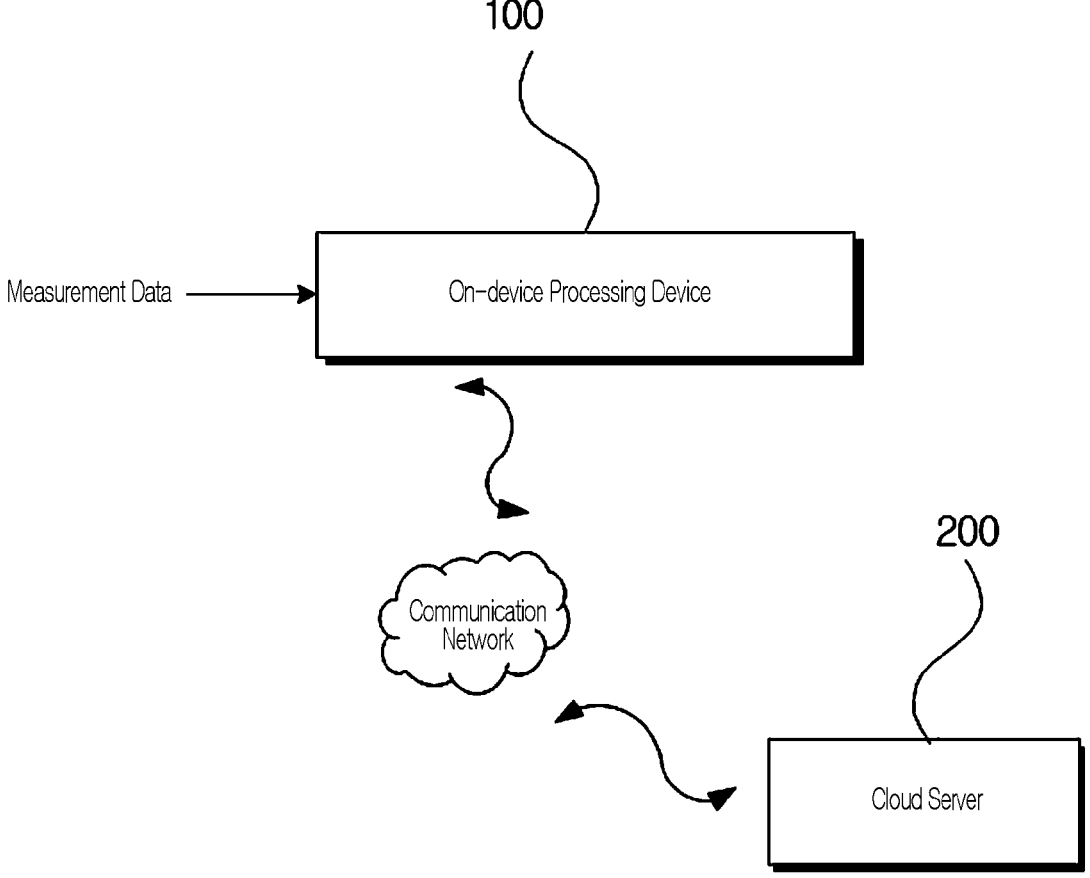
FIG. 1 is a configuration view illustrating an on-device based data analysis system according to the exemplary embodiment.

Hereinafter, exemplary embodiments of the present disclosure will be described in detail with reference to the drawings.

Advantages and features of the present disclosure and the methods of achieving the same will become apparent with reference to the exemplary embodiments described below in conjunction with the accompanying drawings. However, the present disclosure is not limited to the exemplary embodiments disclosed below, but will be implemented in a variety of different forms. These exemplary embodiments are provided only to complete the embodiments of the present disclosure and to completely inform the scope of the present disclosure to those skilled in the art to which the present disclosure pertains, and the present disclosure is only defined by the scope of the claims.

The terms used in the present specification will be briefly described, and the present disclosure will be described in detail.

The terms used in the present disclosure have selected general terms that are currently widely used as possible while considering functions in the embodiments of the present disclosure, but this may vary according to the intentions of technicians working in the field, the judicial precedent, the emergence of new technologies, etc. In addition, in certain cases, there are terms arbitrarily selected by the applicant, and in this case, the meaning of the terms will be described in detail in the description of the corresponding embodiments of the present disclosure. Therefore, the terms used in the present disclosure should not be defined by simple names of the terms, but be defined based on the meaning of the terms and the overall contents of the present disclosure.

Throughout the description of the present disclosure, when a part is said to "include" or "comprise" a certain component, it means that it may further include or comprise other components, without excluding other components unless the context clearly indicates otherwise. In addition, the term "part" or "unit" used in the specification means software or hardware components such as FPGA or ASIC, and the term "part" or "unit" performs certain roles. However, "part" or "unit" is not limited to software or hardware. The term "part" or "unit" may be configured to reside in an addressable storage medium or may be configured to operate one or more processors.

Accordingly, the term "part" or "unit" as an example includes: components such as software components, object-oriented software components, class components, and task components; and other components such as processes, functions, properties, procedures, subroutines, segments of program code, drivers, firmware, microcode, circuits, data, databases, data structures, tables, arrays, and variables. The components and functions provided in "parts" or "units" may be combined into a smaller number of components and "parts" or "units", or further separated into additional components and "parts" or "units".

Hereinafter, with reference to the accompanying drawings, the exemplary embodiments of the present disclosure will be described in detail so that those skilled in the art can easily implement the present disclosure. In addition, portions irrelevant to the description are omitted in order to clearly describe the present disclosure in the drawings.

Figure 2:
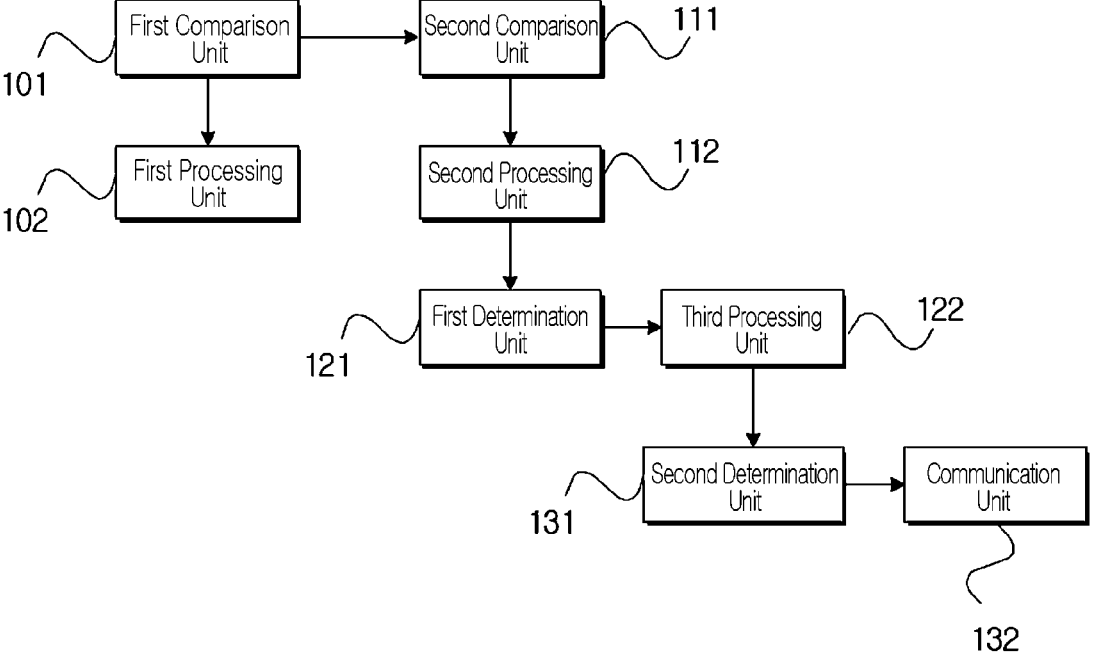
FIG. 2 is a detailed configuration view illustrating an on-device processing device according to the exemplary embodiment.

FIG. 1 is a configuration view illustrating an on-device based data analysis system according to an exemplary embodiment, and FIG. 2 is a detailed configuration view illustrating an on-device processing device of FIG. 1.

Referring to FIGS. 1 and 2, the on-device based data analysis system according to the exemplary embodiment has a configuration for transmitting collected measurement data to a cloud server in a case where a size of measurement data collected from sensors, processes, or various equipment according to a user request is greater than or equal to an upper limit of a predetermined range of a predetermined on-device resource usage rate, and accordingly, the system of the exemplary embodiment may include an on-device processing device 100 and a cloud server 200.

Here, the measurement data collected from the sensors and various equipment is data of industries in the fields such as mechanical robots, electronics and electricity, automobiles/aviation/marine, steel/chemicals/textiles, and root industries, and the measurement data collected from the processes may be secured from data obtained by utilizing data from smart factories, demo factories, and representative factories, the utilized data being able to derive results and apply improvement by using manufacture industry data.

Meanwhile, the on-device processing device 100 and cloud server 200 may be provided in a structure in which these components are configured to be separated from each other as shown in FIG. 1 and connected to each other through a wireless or wired communication. As another example, the on-device processing device 100 and cloud server 200 may be devices directly connected to each other through an electric wire, connector, or the like, and is not limited thereto.

The on-device processing device 100 may process and analyze measurement data, for example, unstructured data such as information, photos, and videos, collected from sensors, processes, equipment, and IoT infrastructure, and may check an analysis result by means of a visualization dashboard. As another example, the on-device processing device 100 may check an analysis result by means of a user terminal that has received the analysis result on a web-basis.

That is, the on-device processing device 100 processes, at high speed, various kinds of large-volume time-series data generated in units of milliseconds (ms) and nanoseconds (ns) in actual industrial sites where a process such as smart factory semiconductor processing is operated. Accordingly, the reception time and traffic of measurement data transmitted through a communication network are reduced, and the efficiency and cost of the measurement data are reduced as well. Accordingly, in the exemplary embodiment, measurement data whose size is able to be processed by the on-device processing device 100 is processed by the on-device processing device 100 based on the measurement data and the on-device resource usage rate, and measurement data whose size is unable to be processed is transmitted to the cloud server. Here, the on-device resource usage rate is set by an on-device CPU and RAM and the like, and capacities of the on-device CPU and RAM set with the on-device resource usage rate may be applied with values already applied by those skilled in the art. In the present specification, the on-device CPU and RAM capacities applied to the on-device resource usage rate are not specifically specified, but should be understood at the standard of those skilled in the art.

Accordingly, the on-device processing device 100 is configured to perform a function of comparing the size of the collected measurement data with the predetermined on-device resource usage rate and to perform a function of processing the measurement data collected on the on-device basis according to a comparison result. Here, the on-device processing device 100 is provided with a first comparison unit 101, a first processing unit 102, a second comparison unit 111, a second processing unit 112, a first determination unit 121, a third processing unit 122, a second determination unit 131, and a communication unit 132.

The first comparison unit 101 compares measurement data with an on-device resource usage rate. For example, when a size of collected measurement data is within a predetermined range (i.e., 30% to 70%) of the on-device resource usage rate, the collected measurement data is transmitted to the first processing unit 102.

The first processing device 102 divides the collected measurement data per unit size per unit time, and then performs noise removal, pre-processing, and analysis on the measurement data divided per unit size per unit time.

Meanwhile, the second comparison unit 111 determines whether the size of the measurement data collected as a result of the comparison performed by the first comparison unit 101 is less than a lower limit (i.e., 30%) of the predetermined range (30% to 70%) of the on-device resource usage rate, and transmits the collected measurement data to the second processing unit 112 when the size of the collected measurement data is less than the lower limit (30%) of the predetermined range (30% to 70%) of the on-device resource usage rate.

The second processing unit 112 performs the noise removal and pre-processing of the measurement data. That is, the first processing unit 112 removes noise from the measurement data by using algorithms such as statistical analysis, normal distribution, and Z score, and then performs a pre-processing process.

The first determination unit 121 determines whether the noise removal and pre-processing of the measurement data are normally performed by the second processing unit 112, and transmits a determination result to the third processing unit 122. As a result of the determination of the first determination unit 121, in a case where the noise removal and pre-processing of the measurement data are abnormally performed, the third processing unit 122 performs the noise removal and pre-processing of the measurement data by performing artificial intelligence-based learning.

Meanwhile, as a result of the determination of the first determination unit 121, in a case where the noise removal and pre-processing of the measurement data are normally performed, the second processing unit 112 continues to perform the noise removal and pre-processing of the measurement data.

The second determination unit 131 determines whether the artificial intelligence-based noise removal and pre-processing on the measurement data are normally performed by the third processing unit 112 or not, and as a result of the determination, in a case where the noise removal and pre-processing of the measurement data are normally performed, the second determination unit 131 performs the noise removal and pre-processing on the measurement data by performing the artificial intelligence-based learning of the third processing unit 122. Here, the determination of whether the noise removal and pre-processing of the measurement data are normally performed or not is determined by an allowable range for each processing item, and such allowable ranges may apply values that are already applied. In the present specification, the allowable range for each processing item is not specifically described, but should be understood at the standard of those skilled in the art.

Meanwhile, as a result of the determination of the second determination unit 121, in a case where the artificial intelligence-based noise removal and pre-processing of the measurement data are abnormally performed, the communication unit 133 transmits the measurement data to the cloud server 200 through the communication network.

Accordingly, the cloud server 200 receives and processes the measurement data, which is transmitted from the on-device processing device 100, including algorithms and databases for storing, processing, and pre-processing of the data or for performing the artificial intelligence-based learning and analysis. That is, the cloud server 200 performs the noise removal and pre-processing for the received measurement data through a previously created learning model, or processes and analyzes the received measurement data through an artificial intelligence model, and then as a result of the analysis, the cloud server 200 generates learning data of the learning model or the artificial intelligence model, so as to distribute the generated learning data to the on-device processing device 100.

Accordingly, in the exemplary embodiment, distributed processing as well as systematic analysis and learning are enabled through interaction between the on-device processing device and the cloud server for large-volume measurement data, and thus the analysis result may be checked in real time through the visualization dashboard.

Figure 3:
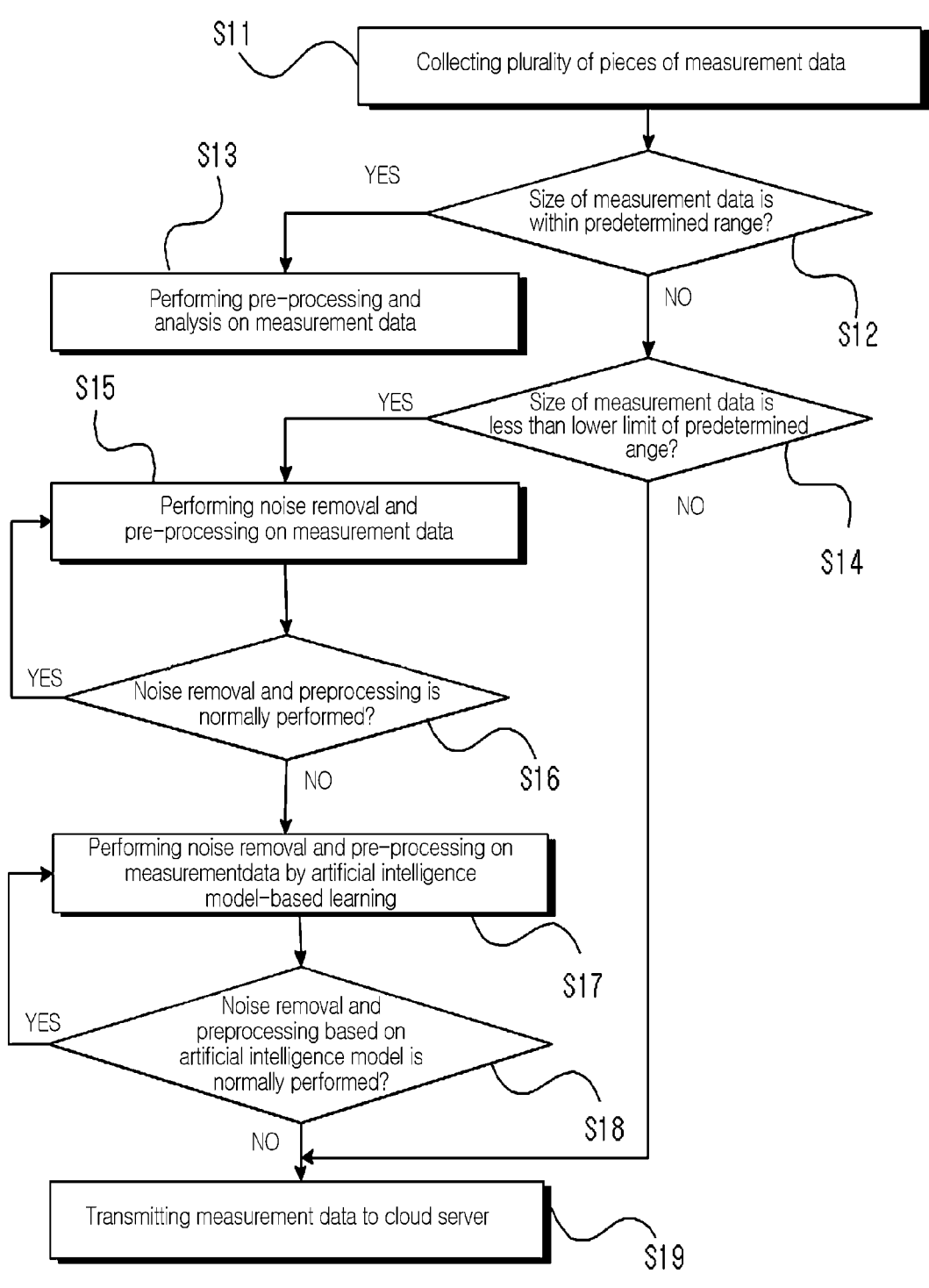
FIG. 3 is an overall flowchart illustrating an on-device based data analysis process according to another exemplary embodiment.

FIG. 3 is an overall flowchart illustrating an operation process of the on-device processing device 100 shown in FIG. 2. An on-device based data analysis method according to another exemplary embodiment will be described with reference to FIG. 3.

First, in step S11, a first comparison unit 101 according to an exemplary embodiment compares measurement data with an on-device resource usage rate, and as a result of the comparison, transmits the collected measurement data to a first processing unit 102 when a size of the measurement data collected is within a predetermined range (30% to 70%) of the on-device resource usage rate.

In addition, in step S12, the first processing unit 102 of the exemplary embodiment divides the collected measurement data per unit size per unit time, and then performs noise removal, pre-processing, and analysis of the measurement data divided per unit size per unit time.

Meanwhile, in step S13, a second comparison unit 111 of the exemplary embodiment determines whether a size of the measurement data collected performed by the first comparison unit 101 is less than a lower limit (30%) of the predetermined range (30% to 70%) of the on-device resource usage rate or not, as a result of the comparison.

In steps S14 and S15, a second processing unit 112 of the exemplary embodiment performs the noise removal and pre-processing for the collected measurement data in a case where the size of the collected measurement data is less than a lower limit (30%) of the predetermined range (30% to 70%) of the on-device resource usage rate.

In steps S16 and S17 during the performing of the noise removal and pre-processing, a first determination unit 121 of the exemplary embodiment determines whether the noise removal and pre-processing of the measurement data are normally performed or not, and as a result of the determination, a third processing unit 122 of the exemplary embodiment performs the noise removal and pre-processing through previously-created artificial intelligence model-based learning in a case where the noise removal and pre-processing of the measurement data are abnormally performed.

In addition, in steps S18 and S19, a second determination unit 131 of the exemplary embodiment determines whether the noise removal and pre-processing are normally performed through the artificial intelligence model-based learning or not, and as a result of the determination, transmits the measurement data to a cloud server 200 in a case where the noise removal and pre-processing through the artificial intelligence model-based learning are abnormally performed.

Thereafter, a processing result of at least one of the on-device processing device 100 and the cloud server 200 is confirmed by means of a visualization dashboard.

Accordingly, in the exemplary embodiment, in a case where a size of measurement data collected from sensors, processes, or various equipment according to a user request is greater than or equal to an upper limit of a predetermined range of an on-device resource usage rate, the collected measurement data is transmitted to a cloud server to perform noise removal, pre-processing, and analysis on the measurement data on a cloud-basis, and in a case where a size of measurement data is within the predetermined range of the on-device resource usage rate or is less than a lower limit, the noise removal, pre-processing, and analysis is performed on the measurement data on an on-device basis, so that distributed processing between the on-device processing device and the cloud server is performable, whereby loads on the cloud server may be reduced.

INDUSTRIAL APPLICABILITY

According, in a case where a size of measurement data collected from sensors, processes, or various equipment according to a user request is greater than or equal to an upper limit of a predetermined range of an on-device resource usage rate, the collected measurement data is transmitted to a cloud server to perform noise removal, pre-processing, and analysis on the measurement data on a cloud-basis, and in a case where a size of measurement data is within the predetermined range of the on-device resource usage rate or is less than a lower limit, the noise removal, pre-processing, and analysis is performed on the measurement data on an on-device basis, so that distributed processing between the on-device processing device and the cloud server is performable, whereby loads on the cloud server may be reduced. Therefore, as for the on-device based data analysis system and the method, the embodiments of the present disclosure may bring about great progress in terms of operational accuracy and reliability, and may further provide performance efficiency. In addition, the embodiments of the present disclosure not only has sufficient potential for marketing or sales of on-device chips, cloud servers, etc., but also has capabilities to the extent that the embodiments may be clearly implemented in reality, thereby having industrial applicability.

The invention claimed is:

1. An on-device based data analysis system, the system comprising:

one or more of sensors or various electrical or mechanical equipment installed in a smart factory for semiconductor processing;

an on-device processing device including one or more processors, a communication device and a storage medium and for using in the smart factory for semiconductor processing, the on-device processing device being configured to collect communicate in real time with the sensors or various electrical or mechanical equipment, receive in real time a plurality of pieces of measurement data measured by the sensors or various electrical or mechanical equipment, perform noise removal and pre-processing of the received measurement data, and transmit in real time a result of the noise removal and the pre-processing to a visualization dashboard; and a cloud server separated from the on-device processing device and connected to the on-device processing device through a wireless or wired communication network, and configured to perform processing the received measurement data whose size is unable to be processed by the on-device processing device, and transmit a result of the processing to the visualization dashboard, wherein the on-device processing device further includes:

a comparator configured to obtain an on-device resource usage rate by comparing in real time the size of the received measurement data against data processing capacities of the processors and the storage medium;

a first processing processor configured to divide the received measurement data per unit size per unit time and to perform the noise removal and the pre-processing of the measurement data in a case where the size of the received measurement data is within a predetermined range of the on-device resource usage rate; and a second processing processor configured to perform the noise removal and the pre-processing of the received measurement data in a case where the size of the received measurement data is less than a lower limit of the predetermined range of the on-device resource usage rate, wherein the on-device processing device is configured to transmit, through the wireless or wired communication network, the received measurement data to the cloud server in a case where the size of the received measurement data exceeds the predetermined range of the on-device resource usage rate, and wherein the cloud server is configured to perform the noise removal and the pre-processing of the received measurement data in the case where the size of the received measurement data exceeds the predetermined range of the on-device resource usage rate, thereby reducing reception time and traffic of the received measurement data and increasing efficiency of processing the received measurement data.

2. The system of claim 1, wherein the on-device processing device further comprises:

a third processing processor for further performing the noise removal and the pre-processing of the received measurement data by using an artificial intelligence model-based learning.

3. An on-device based data analysis method, the method comprising:

receiving in real time, by an on-device processing device which is used for the smart factory for semiconductor processing and includes one or more processors, a communication device and a storage medium, a plurality of pieces of measurement data measured by one or more of sensors or various electrical or mechanical equipment installed in the smart factory for semiconductor processing;

obtaining, by a comparator of the on-device processing device, an on-device resource usage rate by comparing in real time the size of the received measurement data against data processing capacities of the processors and the storage medium;

dividing, by a first processing processor of the on-device processing device, the received measurement data per unit size per unit time and performing noise removal and pre-processing of the measurement data in a case where the size of the received measurement data is within a predetermined range of the on-device resource usage rate;

performing, by a second processing processor of the on-device processing device, the noise removal and the pre-processing of the received measurement data in a case where the size of the received measurement data is less than a lower limit of the predetermined range of the on-device resource usage rate;

transmitting, by the on-device processing device through a wireless or wired communication network, the received measurement data to a cloud server, which is separated from the on-device processing device and connected to the on-device processing device through the wireless or wired communication network, in a case where the size of the received measurement data exceeds the predetermined range of the on-device resource usage rate;

performing, by the cloud server, the noise removal and the pre-processing of the received measurement data in the case where the size of the received measurement data exceeds the predetermined range of the on-device resource usage rate, thereby reducing reception time and traffic of the received measurement data and increasing efficiency of processing the received measurement data; and transmitting, by the on-device processing device or the cloud server, a result of the processing to a visualization dashboard.

4. The method of claim 3, further comprising:

performing the noise removal and the pre-processing of the received measurement data, by a third processing processor of the on-device processing device, by using artificial intelligence model-based learning.

5. A computer readable medium having a computer program stored thereon, the computer program comprising:

a program for executing an on-device based data analysis method of claim 3.

6. The system of claim 1, wherein the predetermined range of the on-device resource usage rate is 30% to 70%.

7. The system of claim 3, wherein the predetermined range of the on-device resource usage rate is 30% to 70%.

* * * * *